Sept. 21, 1965   D. G. BAMFORD   3,207,250
VEHICLE COWLING AND HOOD CONSTRUCTION
Filed April 24, 1963   2 Sheets-Sheet 1

INVENTOR.
Donald G. Bamford
BY
Barnard, McGlynn & Reising
ATTORNEYS

Sept. 21, 1965     D. G. BAMFORD     3,207,250
VEHICLE COWLING AND HOOD CONSTRUCTION
Filed April 24, 1963     2 Sheets-Sheet 2

INVENTOR.
Donald G. Bamford
BY
Barnard, McGlynn & Reising
ATTORNEYS

United States Patent Office 3,207,250
Patented Sept. 21, 1965

1

3,207,250
VEHICLE COWLING AND HOOD
CONSTRUCTION
Donald G. Bamford, Detroit, Mich., assignor to Massey-
Ferguson Incorporated, Detroit, Mich., a corporation
of Michigan
Filed Apr. 24, 1963, Ser. No. 275,285
12 Claims. (Cl. 180—68)

This invention relates to a cowling and hood construction for the radiator and engine of an automotive vehicle, and is particularly characterized by an improved air intake system for supplying clean relatively cool air to the vehicle engine for combustion purposes, and an air cooling system including a radiator for the engine insuring that all of the cooling air supplied to the radiator is first filtered to remove at least a substantial portion of dust, chaff, insects and other such deleterious foreign materials therefrom.

It is highly desirable to the efficient operation of the internal combustion engine of an automotive vehicle to supply relatively clear, cool, and hence dense, air to the engine for combustion purposes, and to remove chaff, insects and other foreign materials from air being drawn through the radiator to alleviate clogging of the latter. Problems are presented in achieving these desirable results with agricultural tractors which are more often than not required to operate under conditions in which the ambient air is laden with dirt, dust, chaff, insects and other foreign bodies which, if not filtered, can damage the engine when supplied to the combustion cylinders thereof, and can clog the air filter assembly associated therewith or the radiator associated with the cooling system for the engine. In this regard, the relatively great heat generated by the engine of an agricultural tractor can result in heating of the ambient combustion air being supplied to the engine, resulting in a less dense and hence less efficient air charge in the fuel-air mixture supplied to the cylinders of the internal combustion engine.

In view of the foregoing considerations, the present invention is directed to an automotive vehicle of the type including an engine having a cooling fan disposed rearwardly of a radiator to draw cooling air therethrough, and is particularly characterized by radiator and engine cowling means including a grille structure disposed forwardly of the radiator for flow of cooling air therethrough to the radiator and a hood structure extending rearwardly over the radiator and the engine and including a swingable hood panel for access to the engine and radiator, such cowling means defining a cooling air duct in flow communication between the aforementioned grille structure and the radiator and including sealing means sealingly engaging a peripheral portion of the radiator about the core thereof, whereby all cooling air flowing through the radiator core must first pass through the aforementioned grille structure and duct.

More specifically in this regard, the invention is more particularly characterized by a perforate filter screen forming a part of and removably mounted with respect to the grille structure for access to the radiator, whereby substantially all cooling air passing through the aforementioned duct and the radiator must first pass through such filter screen for removal therefrom of relatively large particles of dirt, chaff, insects and other foreign bodies entrained in the cooling air thereby preventing clogging of air flow through the radiator core. Thus, by avoiding clogging of air flow through the radiator core, the heat transfer characteristics of the latter are enhanced, thereby providing more effective operation of the cooling system of the vehicle.

The aforementioned cowling means is particularly characterized by a plurality of sheet metal panel mem-

2 bers projecting toward and having edge portions terminating adjacent peripheral portions of the radiator and about the core thereof, and resilient sealing strips suitably secured to the edge portions of such panel members and sealingly engaging such peripheral portions of the radiator to substantially seal the cooling air duct from passage therethrough of any air other than that first passing through the aforesaid filter screen.

The present invention is further characterized by an air cleaner assembly fixedly mounted on the vehicle, and an air supply means including means extending through and swingable with the aforementioned swingable hood panel and extending above the latter to a sufficient extent in a closed position thereof to place its intake end at a relatively high level to receive and supply relatively cool ambient air to and through the air cleaner assembly to the combustion chambers of the engine.

More specifically in this regard, the aforementioned air supply means comprises an air inlet conduit secured in flow communication with the air cleaner assembly and having an air inlet end upstanding therefrom and disposed in a position below the swingable hood panel in a closed position thereof. In turn, an air intake conduit or stack is fixedly mounted on the hood panel for swinging movement therewith and extends therethrough, and includes an air outlet end disposed below the hool panel and opposite the air inlet end of the air inlet conduit with the hood panel in closed position. An annular resilient sealing member is carried at the outlet end of the intake conduit or stack and is so positioned with respect to the upstanding inlet end of the air inlet conduit that it will sealingly engage the latter with the hood panel in its closed position, and yet will be moved away from sealing engagement with the air inlet conduit upon swinging of the hood panel to an open position.

In order to facilitate an understanding of the invention, a preferred embodiment thereof will now be described with reference to the accompanying drawings in which.

Figure 1:
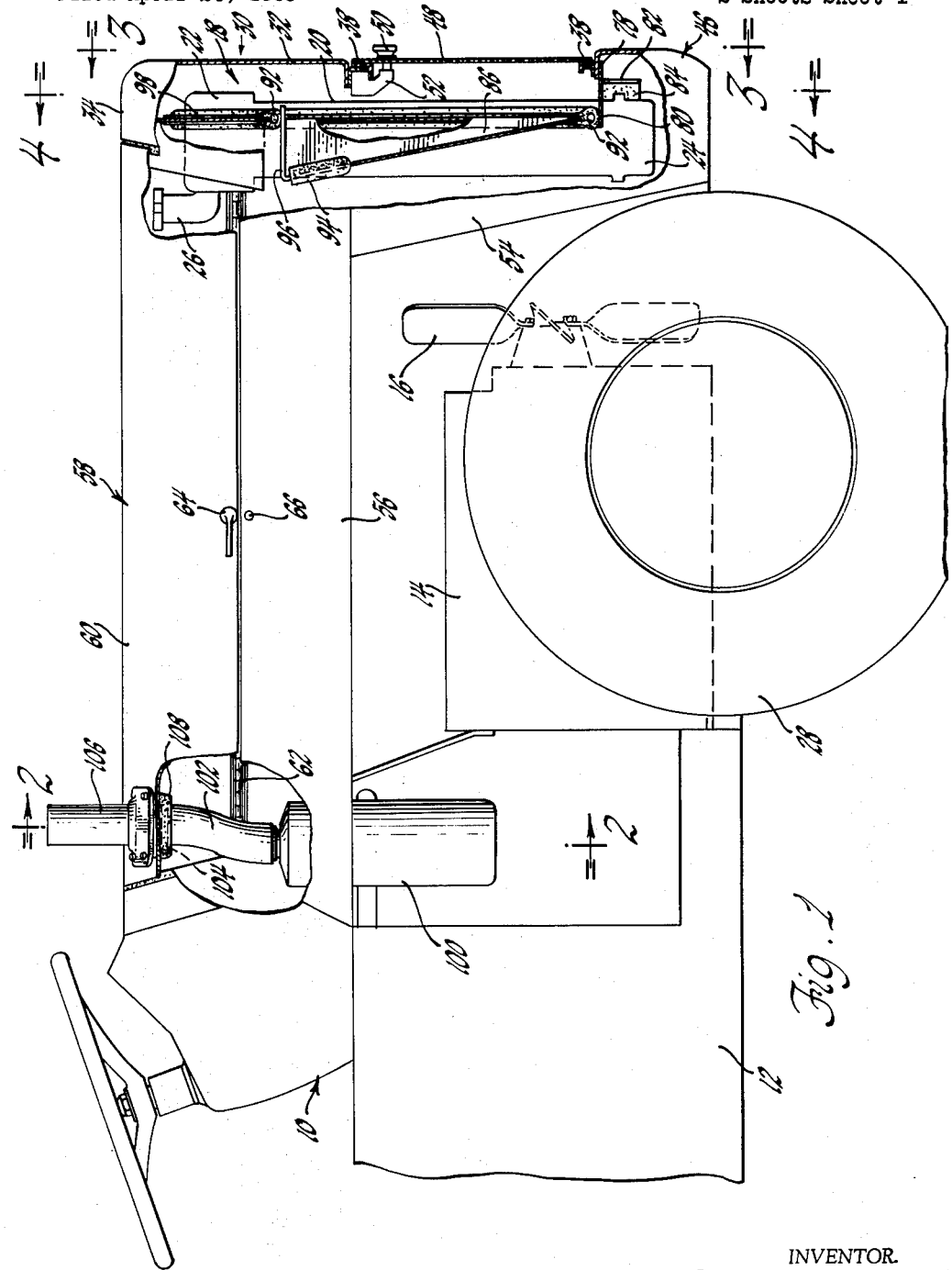
FIGURE 1 is a fragmentary side elevational view of an agricultural tractor, with parts broken away to illustrate certain details, illustrating one preferred embodiment of the invention.

Referring now to the drawings, the numeral 10 generally indicates an agricultural tractor having the usual frame or chassis indicated at 12 supporting a conventional internal combustion engine 14 having the usual cooling fan 16 disposed rearwardly of a conventional radiator indicated generally at 18 and including the usual radiator core 20 and upper and lower headers 22 and 24, respectively. The radiator includes a filling conduit 26 extending upwardly from the upper header thereof and, of course, the radiator is connected in the fluid cooling system with the engine by the usual radiator hoses, not shown. The usual front and rear wheels are suitably associated with the vehicle, only one of the front wheels 28 being shown in FIGURE 1 of the drawing.

Figure 3:
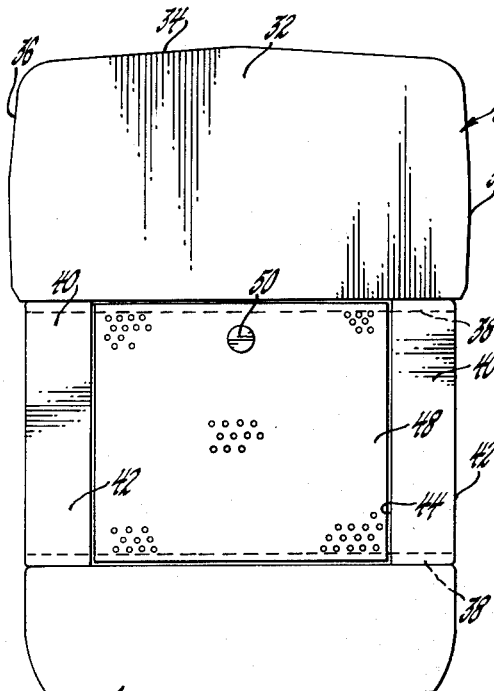
FIGURE 3 is a view taken on line 3—3 of FIGURE 1.

Referring now particularly to FIGURES 1 and 3 through 5, a radiator grille structure indicated generally at 30 forms a part of the body of the vehicle, is disposed forwardly of the radiator 18 and extends generally peripherally thereabout. More specifically, the grille structure 30 comprises the usual hood cap 32 having a front depending wall disposed forwardly of the radiator, and a continuous side wall extending rearwardly from such front wall and including an upper wall portion 34 extending transversely above the radiator upper header 22 and side wall portions 36 depending therefrom to each side of the upper radiator header. The hood cap 32 is suitably disposed above a grille frame including the vertically spaced transversely extending frame members 38 joining the transversely spaced vertically depending side wall members 40 each of which includes a rearwardly extending wall portion 42 as illustrated particularly in FIGURES 4 and 5 so as to extend along and in spaced relation to the sides of the radiator 18. The frame members 38 and side wall members 40 define a rectangular opening 44 for a purpose to appear hereinafter. A lower transversely extending grille assembly indicated generally at 46 is disposed below the lower frame member 38 of the aforementioned grille frame. The rectangular opening 44 aforedescribed is adapted to be closed by the multiple perforated filter screen 48 as illustrated in FIGURES 1 and 3, a suitable latch mechanism 50 being carried by the filter screen and being cooperable with a keeper member 52 secured to the upper frame member 38 of the grille frame to removably secure the filter screen in the position shown in the drawings. The latch mechanism can be manipulated to remove the filter screen for access to the radiator and particularly its core 20 for the purpose of cleaning or otherwise servicing the latter.

Figure 2:
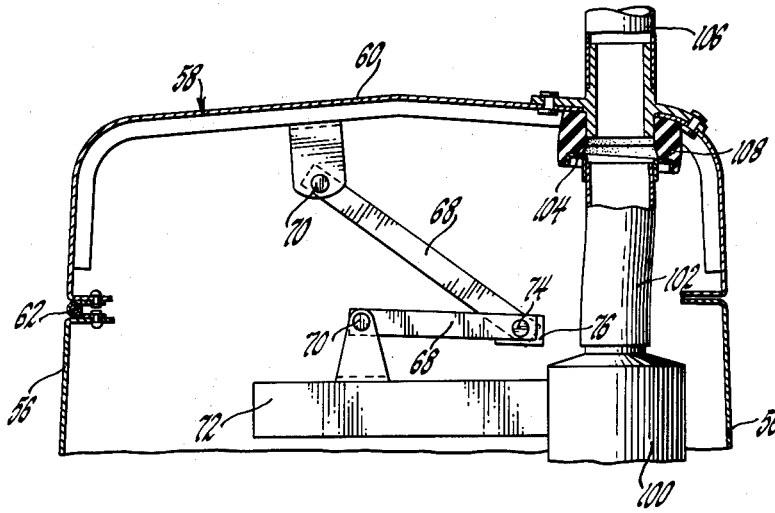
FIGURE 2 is a somewhat enlarged fragmentary sectional view taken on line 2—2 of FIGURE 1.
Figure 5:
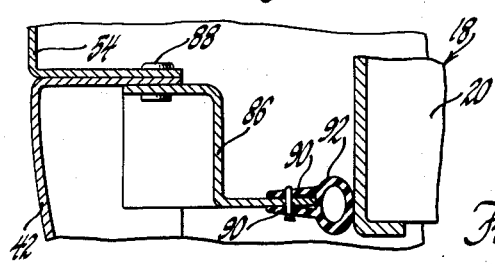
FIGURE 5 is an enlarged fragmentary sectional view taken on line 5—5 of FIGURE 4.

As best illustrated in FIGURES 1, 2 and 5, a pair of side panel members 54 are respectively suitably secured to each side of the grille structure 30 so as to extend upwardly from the lower grille assembly 46 and have their upper ends connected to the forward ends of a pair of hood panel assemblies 56, one for each side of the vehicle, forming a part of the hood structure indicated generally at 58 extending rearwardly from the grille structure toward the vehicle operator's position and over the engine 14 and radiator 18. The hood panel assemblies 56 are mounted in fixed position and define therebetween an opening adapted to be selectively opened and closed by means of a swingable hood panel 60 extending rearwardly between the hood cap 32 and a position adjacent the vehicle operator's position, and having one side edge thereof suitably hinged as indicated at 62 in FIGURES 1 and 2 to an associated one of the hood panel assemblies 56 of the hood structure. A conventional manually operable latch mechanism 64 is carried at the other side edge of the swingable hood panel and cooperates with a keeper mechanism 66 carried by the associated hood panel assembly 56 for latching the hood panel 60 in a closed position, such hood panel being elevatable about the axis of the hinge 62 for access to the engine 14 and the filler conduit 26 of the radiator. A pair of links 68 each have one end suitably respectively pivotally connected as indicated at 70 to the hood panel 60 and to a fixed structural member 72 carried by the vehicle body, and the other ends thereof pivotally interconnected at the connection indicated at 74 including a stop member 76 carried by one of the links 68 whereby, upon opening the hood panel 60, the links 68 may go over center at their pivot connection 74 and be held in such over center position by means of the stop member 76 to hold the hood panel open until it is desired to close same.

Figure 4:
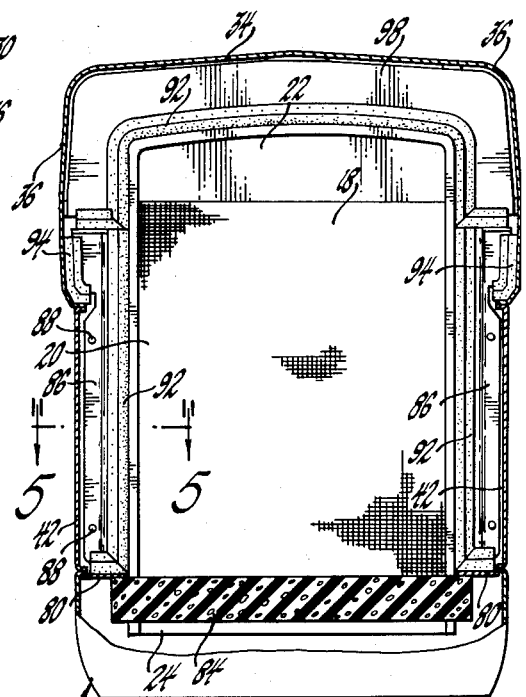
FIGURE 4 is a sectional view taken on line 4—4 of FIGURE 1.

Referring now particularly to FIGURES 1, 4 and 5, the lower grille assembly 46 comprises a sheet metal panel member 78 which extends transversely of the lower header 24 of the radiator and includes a pair of rearwardly presented arms 80 embracing the side edges of the header, and a vertically depending, transversely elongated plate 82 therebetween mounting a resilient block of resilient sealing material 84 sealingly engaging the transverse extent of the forward face of the lower radiator header 24 about the lower edge of the radiator core 20. A pair of side panel members 86 are each suitably secured, as indicated at 88 in FIGURES 4 and 5, to mating inwardly directed shoulders respectively forming a part of the wall portions 42 of the grille structure and the respective side panel members 54 joined thereto. The side panel members 86 have terminal edge portions spaced from the side walls of the radiator core 20 and received within a slot formed between a pair of continuous elongate ears 90 projecting from a flexible body portion of a continuous sealing strip 92 sealingly engaging such side walls of the radiator core. As illustrated particularly in FIGURE 5, the ears 90 are shown as being stapled to the panel members 86, although other methods of securing the sealing strips to the edges of the panels may be employed. The lower edges of each of the side panel members 86 include laterally outwardly projecting edge portions mounting portions of the aforementioned sealing strip which sealingly engage the respective arms 80 of the panel member 78 to either side of the radiator, while the upper portions of each of the side panel members 86 include an auxiliary sealing strip 94, similar to strip 92, secured to an edge thereof so as to sealingly engage the adjacent side wall portions 36 of the hood cap 32. It is to be noted also that each of the side panel members 86 includes a forwardly projecting, substantially horizontal flange member 96 adapted to receive opposite ends of another sealing panel member to be described.

Thus, an upper transversely extending panel member 98 is suitably secured to the hood cap or hood structure and projects inwardly toward and about the upper radiator header 22 and an upper portion of the side walls of the radiator core. Again, an elongated sealing strip 92 is suitably mounted on the terminal inwardly presented edges of the panel member 98 in the manner aforedescribed, and sealingly engages the upper radiator header and an upper portion of the sides of the radiator core, and terminates in laterally projecting portions seated on the horizontal flange members 96 of the respective side panel members 86.

Thus, the grille structure 30 including the hood cap 32, filter screen 48 and the lower grille assembly 46, the block of sealing material 84 carried by the latter and the respective elongate sealing strips 92 and 94 carried by the side panel members 86 and top panel member 98 form a radiator cowling means operatively connecting the grille structure and the radiator to define a sealed air duct between the filter screen and the radiator, and particularly the core 20 thereof. In this regard, the respective sealing strips 92 and 94 carried by the top panel member 98 and the side panel members 86 and the block of resilient sealing material 84 carried by the lower grille assembly form a substantially continuous seal about a peripheral portion of the radiator 18 enclosing the core 20 thereof, whereby all cooling air passing through the core of the radiator must first pass through the filter screen 48 to insure that relatively large particles of dirt, chaff, insects and other foreign bodies may be removed therefrom to prevent clogging of air flow through the radiator. On the other hand, to the extent that some build-up of dirt or other debris forms on the forward face of the radiator, the filter screen may be removed for purposes of cleaning the radiator.

Referring now particularly to FIGURES 1 and 2, the numeral 100 indicates a conventional air cleaner assembly suitably mounted on the vehicle beneath the hood structure 58 rearwardly of the engine 14 and connected to the intake manifold of the engine, such connection and manifold not being shown since they are of conventional construction. The upper end of the air cleaner assembly is connected in air flow relationship to the lower end of a generally upstanding, rigid air inlet conduit 102 having a continuous annular, radially flared seating shoulder 104 formed at the upper end thereof and disposed beneath the swingable hood panel 60 in the closed position thereof. An air intake conduit or stack 106 is suitably secured to and extends through the hood panel 60 for swinging movement therewith, and projects upwardly therefrom to a sufficiently high level above the tractor to receive relatively cool ambient air for supply through the conduit or stack 106 to the air inlet conduit 102 and the air cleaner assembly 100. To this end, the lower end of the air intake conduit or stack 106 is disposed below the hood panel 60 and is so related to the upper end of the air inlet conduit 102 and the shoulder 104 thereof as to be disposed opposite thereto and spaced slightly therefrom with the hood panel closed. An annular resilient sealing donut 108 is suitably secured about the lower end of air intake conduit 106 and projects downwardly therefrom for sealing seating engagement on and about the shoulder 104 upon closure of the hood panel 60.

Thus, a sealed flow connection is made between the stack or conduit 106 and the conduit 102 for supplying combustion air to the air cleaner assembly 100 to the engine with the hood panel 60 closed. Upon unlatching the aforedescribed latch mechanism 64 and swinging the hood panel 60 to an open position, it will be readily apparent that the sealing donut 108 freely moves off of its seat on the shoulder 104, and will be automatically redisposed in sealing engagement therewith upon subsequently closing the hood panel.

The embodiments of the invention in which an exclusive property or privilege is claimed are defined as follows:

1. In the combination including an engine having a cooling fan disposed rearwardly of a radiator to draw cooling air therethrough for passage over said engine, and a grille structure disposed forwardly of said radiator and including a perforate filter screen to filter cooling air therethrough to said radiator; the improvement comprising cowling means forming a sealed imperforate cooling air duct between said grille structure and said radiator, whereby all cooling air flowing through said radiator must first pass through said filter screen and said duct.

2. The combination as defined in claim 1 further comprising means removably mounting said filter screen relative to said grille structure for access to said radiator.

3. In the combination including an engine having a cooling fan disposed rearwardly of a radiator to draw cooling air therethrough for passage over said engine, and a grille structure disposed forwardly of said radiator and including a perforate filter screen to filter cooling air therethrough to said radiator; the improvement comprising cowling means sealingly engaging a peripheral portion of said radiator and forming a sealed cooling air duct between the latter and said grille structure, whereby all cooling air flowing through said radiator must first pass through said filter screen and said duct.

4. In an automotive vehicle of the type including an engine having a cooling fan disposed rearwardly of a radiator to draw cooling air therethrough for passage over said engine, and a grille structure disposed forwardly of said radiator and including a perforate filter screen to filter cooling air therethrough to said radiator; the improvement comprising cowling means extending between said grille structure and said radiator to define a sealed imperforate cooling air duct therebetween, said cowling means including sealing means sealingly engaging a peripheral portion of said radiator about the core thereof whereby all cooling air flowing through the core of said radiator must first pass through said filter screen and said duct.

5. The vehicle according to claim 4 wherein said cowling means comprises a plurality of panel members respectively having edge portions thereof disposed adjacent a peripheral portion of said radiator about the core thereof, and said sealing means comprises sealing strips respectively secured to said edge portions of said panel members and sealing engaging the peripheral portion of said radiator about the core thereof.

6. In an automotive vehicle of the type including an engine having a cooling fan disposed rearwardly of a radiator to draw cooling air therethrough for passage over said engine; the improvement comprising radiator cowling means extending about and spaced from said radiator and including a grille structure disposed forwardly of said radiator and having a perforate filter screen to filter cooling air therethrough to said radiator, panel means connected to said cowling means and terminating in edge portions adjacent a substantially continuous peripheral portion of said radiator surrounding the core thereof, and sealing means secured to said edge portions and sealingly engaging said peripheral portion of said radiator to define a sealed imperforate cooling air duct between said grille structure and the core of said radiator, whereby all cooling air flowing through the core of said radiator must first pass through said filter screen and said duct.

7. In the combination including an engine having a cooling fan disposed rearwardly of a radiator to draw cooling air therethrough for passage over said engine, a grille structure disposed forwardly of said radiator and including a perforate filter screen to filter cooling air therethrough to said radiator, and a hood panel extending rearwardly from said grille structure over said engine and being swingably mounted on said vehicle for movement between closed and opened positions for access to said engine and radiator; the improvement comprising cowling means forming a sealed imperforate cooling air duct between said grille structure and said radiator whereby all cooling air flowing through the latter must first pass through said filter screen and said duct, an air cleaner assembly disposed rearwardly of said engine and including an air inlet opening disposed below said hood panel, an air intake stack fixed for swinging movement with said hood panel and having an air discharged opening disposed below said hood panel with the latter in a closed position, and means automatically sealingly connecting and disconnecting respectively said inlet and discharge openings upon moving said hood panel to the closed and opened positions thereof.

8. In an automotive vehicle of the type including an engine having a cooling fan disposed rearwardly of a radiator to draw cooling air therethrough for passage over said engine, a grille structure disposed forwardly of said radiator for flow of cooling air therethrough to said radiator, and a hood panel extending rearwardly from said grille structure over said engine and being swingably mounted on said vehicle for movement between closed and opened positions for access to said engine and radiator; the improvement comprising cowling means extending between said grille structure and said radiator forwardly of said hood panel to define a substantially imperforate cooling air duct therebetween, said cowling means including sealing means sealingly engaging a peripheral portion of said radiator about the core thereof whereby all cooling air flowing through the core of said radiator must first pass through said grille structure and said duct, an air cleaner assembly fixedly mounted on said vehicle rearwardly of said engine and below said hood panel and including an upwardly extending air inlet conduit having an air inlet end disposed below said hood panel, an air intake conduit fixed for swinging movement with and extending through said hood panel and having an air outlet end disposed opposite said air inlet end of said air inlet conduit with said hood panel in the closed position thereof, and sealing means secured on the end of one of said conduits for sealing engagement and disengagement respectively with the end of the other of said conduits upon moving said hood panel to the closed and opened positions thereof.

9. The vehicle according to claim 8 wherein said cowling means comprises a plurality of panel members respectively having edge portions thereof disposed adjacent a peripheral portion of said radiator about the core thereof, and said first-named sealing means comprises sealing strips respectively secured to said edge portions of said panel members and sealingly engaging the peripheral portion of said radiator about the core thereof.

10. The automotive vehicle as defined in claim 8 wherein said grille structure includes a perforate filter screen to filter cooling air flowing through said grille structure to said radiator, and means removably mounting said filter screen relative to said grille structure for access to said radiator.

11. The automotive vehicle according to claim 8 wherein said air inlet end of said air inlet conduit includes a radially outwardly extending annular sealing seat, and wherein said second-named sealing means comprises an annular resilient sealing member secured about said air outlet end of said air intake conduit and projects therefrom for seating engagement and disengagement with said sealing seat.

12. In an automotive vehicle of the type including an engine having a cooling fan disposed rearwardly of a radiator to draw cooling air therethrough for passage over said engine, and a grille structure disposed forwardly of said radiator for flow of cooling air therethrough to said radiator; the improvement comprising cowling means extending between said grille structure and said radiator to define a substantially imperforate cooling air duct therebetween, said cowling means including sealing means sealingly engaging a peripheral portion of said radiator about the core thereof, whereby all cooling air flowing through the core of said radiator must first pass through said grille structure and said duct, said grille structure including a perforate filter screen to filter cooling air flowing through said grille structure to said radiator, and means removably mounting said filter screen relative to said grille structure for access to said radiator.

References Cited by the Examiner

UNITED STATES PATENTS

| 2,050,451 | 8/36 | Nallinger | 180—54 |
| 2,191,599 | 2/40 | Valletta | 180—54 X |
| 2,193,229 | 3/40 | Exner | 180—54 X |
| 2,358,486 | 9/44 | Zeeb | 180—54 X |
| 2,701,024 | 2/55 | Thomas | 180—69 |
| 2,715,448 | 8/55 | Zeeb | 180—68 |
| 2,881,860 | 4/59 | Ternes | 180—69 X |
| 3,017,944 | 1/62 | Norrie | 180—69 |

FOREIGN PATENTS 710,588 6/54 Great Britain.

A. HARRY LEVY, *Primary Examiner.*

UNITED STATES PATENT OFFICE
CERTIFICATE OF CORRECTION

Patent No. 3,207,250                        September 21, 1965

Donald G. Bamford

It is hereby certified that error appears in the above numbered patent requiring correction and that the said Letters Patent should read as corrected below.

Column 1, line 22, for "clear" read -- clean --; column 3, line 17, for "multiple" read -- multiply --; column 5, line 47, after "sealed" insert -- imperforate --; line 71, for "sealing" read -- sealingly --.

Signed and sealed this 12th day of April 1966.

(SEAL)
Attest:

ERNEST W. SWIDER                          EDWARD J. BRENNER
Attesting Officer                              Commissioner of Patents